(12) United States Patent
Pierik et al.

(10) Patent No.: US 8,575,253 B2
(45) Date of Patent: *Nov. 5, 2013

(54) ARAMID PARTICLES CONTAINING PEROXIDE RADICAL INTIATOR

(75) Inventors: Sebastianus C. J. Pierik, Lent (NL); Rabindra N. Datta, Schalkhaar (NL); Sumana Datta, legal representative, Schalkhaar (NL)

(73) Assignee: Teijin Aramid B.V., Arnhem (NL)

( * ) Notice: Subject to any disclaimer, the term of this patent is extended or adjusted under 35 U.S.C. 154(b) by 98 days.

This patent is subject to a terminal disclaimer.

(21) Appl. No.: 12/734,557

(22) PCT Filed: Nov. 7, 2008

(86) PCT No.: PCT/EP2008/065134
§ 371 (c)(1),
(2), (4) Date: May 7, 2010

(87) PCT Pub. No.: WO2009/060067
PCT Pub. Date: May 14, 2009

(65) Prior Publication Data
US 2010/0292398 A1     Nov. 18, 2010

(30) Foreign Application Priority Data

Nov. 9, 2007  (EP) .................................. 07021841

(51) Int. Cl.
| | | |
|---|---|---|
| C08K 5/14 | (2006.01) | |
| C08C 19/34 | (2006.01) | |
| C08G 69/32 | (2006.01) | |
| C08G 69/46 | (2006.01) | |
| C08G 69/48 | (2006.01) | |

(52) U.S. Cl.
USPC ............... 524/397; 252/186.1; 252/186.25; 252/186.26; 252/186.42; 523/200; 523/210; 523/211; 524/606; 524/607; 525/420

(58) Field of Classification Search
USPC ............. 252/186.1, 86.25, 186.26, 186.42; 523/200, 210, 211; 524/606, 607; 525/420
See application file for complete search history.

(56) References Cited

U.S. PATENT DOCUMENTS

| | | |
|---|---|---|
| 2,999,788 A | 9/1961 | Morgan |
| 2,999,834 A | 9/1961 | Wismer et al. |
| 3,484,333 A | 12/1969 | Vanderbilt |
| 3,674,542 A | 7/1972 | Vanderbilt et al. |
| 3,969,568 A | 7/1976 | Sperley |
| 4,377,398 A | 3/1983 | Bennett |
| 4,939,209 A | 7/1990 | Kitagawa et al. |
| 5,238,978 A * | 8/1993 | Stein ............................ 523/351 |
| 5,319,003 A | 6/1994 | Gomez et al. |
| 5,368,928 A | 11/1994 | Okamura et al. |
| 5,571,288 A | 11/1996 | Zakikhani et al. |
| 5,830,395 A * | 11/1998 | Vercesi et al. ................ 264/101 |
| 6,068,922 A | 5/2000 | Vercesi et al. |
| 6,191,286 B1 | 2/2001 | Gunther et al. |
| 2006/0063884 A1 | 3/2006 | Akiyama |
| 2009/0093575 A1* | 4/2009 | Kabashima et al. .......... 524/195 |
| 2010/0076151 A1* | 3/2010 | Datta et al. ................... 524/571 |

FOREIGN PATENT DOCUMENTS

| | | | |
|---|---|---|---|
| DE | 100 59 287 A1 | | 7/2002 |
| EP | 0 227 048 | * | 7/1987 |
| EP | 0 688 898 A1 | | 12/1995 |
| EP | 0 889 072 A1 | | 1/1999 |
| EP | 1 571 253 A1 | | 9/2005 |
| EP | 1 728 821 | * | 12/2006 |
| JP | A-54-080353 | | 6/1979 |
| WO | WO 95/22576 | | 8/1995 |
| WO | WO 00/58064 A1 | | 10/2000 |
| WO | WO 02/40577 A1 | | 5/2002 |
| WO | WO 2007/015371 | * | 2/2007 |
| WO | WO 2008/040507 | * | 4/2008 |

OTHER PUBLICATIONS

Hofmann, W., "Rubber Technology Handbook," Chapter 4, Rubber Chemicals and Additives, pp. 217-353, Hanser Publishers, Munich, 1989.
International Search Report issued Jan. 22, 2009 in Application No. PCT/EP2008/065134 with written opinion.
International Search Report issued Mar. 17, 2008 in Application No. PCT/EP2007/008496.
Jan. 31, 2012 Office Action issued in copending U.S. Appl. No. 12/504,402.
U.S. Appl. No. 12/504,402, filed Jul. 16, 2009.
Feb. 21, 2013 Office Action issued in U.S. Appl. No. 13/460,623.
Oct. 3, 2012 Office Action issued in U.S. Appl. No. 13/460,623.
U.S. Appl. No. 13/460,623, filed Apr. 30, 2012.

* cited by examiner

Primary Examiner — Robert C Boyle
(74) Attorney, Agent, or Firm — Oliff & Berridge, PLC

(57) ABSTRACT

An aramid particle containing a peroxide radical initiator wherein the particle contains 3-40 wt % peroxide radical initiator based on the weight of the aramid particle. Also, disclosed is a particle-elastomer composition having 100 parts by weight of at least one natural or synthetic elastomer, such as rubber; 0.1 to 20 parts by weight of a peroxide or 0.1 to 25 parts by weight of sulfur, an amount of a sulfur donor providing the equivalent of 0.1 to 25 parts by weight of sulfur, or a mixture of sulfur and a sulfur donor to an equivalent total of 0.1 to 25 parts by weight of sulfur; and 0.1 to 20 parts by weight of the aramid particle.

12 Claims, No Drawings

ARAMID PARTICLES CONTAINING PEROXIDE RADICAL INTIATOR

BACKGROUND

The invention relates to an aramid particle containing a peroxide radical initiator, to an aramid particle-elastomer composition, to skim products and mechanical rubber goods comprising the aramid particle, and to a method for vulcanizing a rubber composition.

In general terms adhesion systems for rubbers and other elastomers are known. For example, WO 95/22576 relates to an adhesion system for use with rubbers, synthetic elastomers and other unsaturated polymers. The system therein describes an adhesion system comprising an isocyanate compound, a polyunsaturated polymer and a plasticizer. Other materials may also be added to this adhesion system to perform other functions, for example a free radical initiator or generator can be added to facilitate bonding to the rubber and other polymers. This free radical initiator or generator will react with the other components of the adhesion system of this invention, either isocyanate or terminal or side groups on either polyunsaturated polymer. The added amount of free radical initiator is not disclosed, but to the skilled man it is known that the addition for such purpose involves low quantities of free radical initiator only. For example, in U.S. Pat. No. 3,484,333 and U.S. Pat. No. 3,674,542 sizing compositions for glass fibers are disclosed. The glass fibers are used as reinforcing materials for elastomers and plastics. The sizing comprises an elastomer and a hydrolyzable silane. According to the claims the sizing can contain from 1 to 6% by weight based on the unsaturated copolymer solids of a free-radical generating curing agent, such as a peroxide, which corresponds to only 0.1 to 0.6 wt % based on the weight of the fibers. In example 15 of U.S. Pat. No. 3,484,333 a glass fiber cloth is treated with a size containing 95 parts of toluene, 4 parts of butadiene-styrene copolymer, 1 part of silane, 0.08 parts of dicumyl peroxide and 0.08 parts of 2,5-dimethyl-2,5-di(t-butyl)peroxyhexane. Assuming a common sizing pick-up of 300 wt % with respect to the glass fiber, the sized glass fiber contains 0.4 wt % of peroxide on yarn after drying.

Such amounts of peroxide are common as is for instance also clear from U.S. Pat. No. 5,319,003 wherein a thermosetting mixture for coating continuous filaments is disclosed. The thermosetting mixture comprises unsaturated polyester or vinyl ester resin, styrene, and a strain relieving polymer. The thermosetting mixture can further contain a curing catalyst such as organic peroxide. The peroxide employed will generally range from about 0.1 to 4 parts by weight and preferably 1 to 2 parts by weight of the initiator per 100 parts by weight of the mixture of resin and strain relieving polymer. For instance, in Table 1 the amount of peroxide is 0.28% by weight, corresponding to 0.4 wt % based on the weight of glass fiber. Similarly, in U.S. Pat. No. 6,191,286 a size comprising an unsaturated imidosilane and a resinous medium is used, which size may include a free-radical generator, such as organic peroxide. The size is supplied to the inorganic solid material from about 0.01 weight percent to about 10 wt %, and preferably from 0.1 to 0.5 wt % based on the weight of the inorganic solid material. In Example 3 the glass fiber is first dipped in a 0.5 wt % silane solution and dried, and then dipped in a toluene solution containing 0.15 wt % dicumyl peroxide. Assuming a common sizing pick-up of 300 wt % with respect to the glass fiber, the glass fiber contains 0.45 wt % peroxide after drying.

Thus organic peroxides have been used in yarn sizing compositions to improve adhesion, however, the amounts used are not higher than 0.5 wt % of the weight of the yarn.

SUMMARY

It has now been found that addition of peroxides to aramid particles, apart from their known adhesion improving properties, can be used to lower Payne effect and hysteresis (tangent delta) of rubber or other elastomer goods. This effect could, however, only be found when using peroxides in amounts that are magnitudes greater than the amounts used up to now.

DETAILED DESCRIPTION OF THE EMBODIMENTS

To this end, the invention pertains to an aramid particle containing a peroxide radical initiator wherein the particle contains 3-40 wt % peroxide radical initiator based on the weight of the aramid particle. More preferably, the particle contains 6 to 30 wt % peroxide.

The peroxide can be any compound which contains at least one peroxide group. Suitable peroxides include organic mono- or bisperoxides. Peroxides can be technically pure or mixed with an inorganic support such as clay or silica, a polymeric support such as EPDM or combinations of these supports. Furthermore, peroxides can be diluted with a solvent or oil such as paraffin oil. Furthermore, peroxides can be dispersed in silicone oil.

Examples of suitable peroxides are cyclic peroxide, diacyl peroxide, dialkyl peroxide, hydroperoxide, peroxycarbonate, peroxydicarbonate, peroxyester, ketone peroxide, derivatives of ketone peroxide, inorganic peroxide, peroxyketal, mixed peroxide and mixtures of any two or more of these peroxides. More preferably, the peroxide is selected from dialkyl peroxyketal, dialkyl peroxide, di(alkylperoxy)alkylene, di(alkylperoxy)aralkylene, alkyl acyl peroxide, alkyl hydro-peroxide, or a mixture thereof, such as dicumyl peroxide, di(t-butyl) peroxide, di(t-butylperoxyisopropyl)benzene, t-butyl peroxy-3,5,5-trimethylhexanoate, 2,5-di-methyl-2,5-di(t-butylperoxy)hexane, cumyl hydroperoxide, 1,1-(t-butylperoxy)-cyclohexane and 1,1-(t-butylperoxy)-3,3,5-trimethylcyclohexane. Most preferably, the peroxide is 1,1-(t-butylperoxy)cyclohexane or 1,1-(t-butylperoxy)-3,3,5-trimethylcyclohexane.

In another aspect the invention relates to an aramid particle-elastomer composition according to claim 7, particularly a rubber composition which is the vulcanization reaction product of an elastomer such as rubber, a vulcanization agent, and the particle according to the invention. The particle of the invention lowers hysteresis and the Payne effect and reduces the heat build-up of the rubber composition. Also disclosed is a vulcanization process as claimed in claim 11, which is carried out in the presence of the particle and the use of these particles in said vulcanization process of elastomers, particularly rubbers. The vulcanization agent can be either a peroxide or sulfur. The sulfur may be replaced by a sulfur donor.

In addition, the present invention relates to a vulcanization process carried out in the presence of the particles and the use of these particles in the vulcanization of rubbers, as recited in claim 11. Further, the invention also encompasses elastomer, particularly rubber products which comprise at least some elastomer (particularly rubber) which has been vulcanized, preferably vulcanized with sulfur or peroxide, in the presence of said particles.

The present invention provides elastomer, particularly rubber having excellent hysteresis behavior and heat build-up without having a significant adverse effect on the remaining properties, when compared with similar sulfur- or peroxide-vulcanization systems without any of the particles. Furthermore elastomer, particularly rubber compound properties are independent of the time between mixing and vulcanization over a period of at least 28 days.

To this end, the invention also relates to an elastomer composition comprising
(a) 100 parts by weight of at least one natural or synthetic elastomer, particularly rubber;
(b1) 0.1 to 25 parts by weight of an amount of sulfur and/or a sulfur donor; or
(b2) 0.1 to 20 parts by weight of peroxide; and
(c) 0.1 to 20 parts by weight of the hereinabove described particle.

Preferred amounts of sulfur, respectively sulfur donor are 1 to 20 parts by weight, more preferably 1 to 15 parts.

Preferred amounts of peroxide for the vulcanization are 1 to 20 parts by weight, more preferably 1 to 15 parts.

Preferred amounts of the above particle are in the range of 0.5 to 10 parts by weight, more preferably in the range of 1 to 10 parts by weight.

The present invention is applicable to all natural and synthetic elastomer, particularly rubbers. Examples of rubbers include, but are not limited to, natural rubber, styrene-butadiene rubber, butadiene rubber, isoprene rubber, acrylonitrile-butadiene rubber, chloroprene rubber, isoprene-isobutylene rubber, brominated isoprene-isobutylene rubber, chlorinated isoprene-isobutylene rubber, ethylene-propylene-diene terpolymers, as well as combinations of two or more of these rubbers and combinations of one or more of these rubbers with other rubbers and/or thermoplastic compounds.

When sulfur vulcanization is applied the required level of sulfur during the vulcanization process is provided by sulfur, optionally together with sulfur donors, or sulfur donors only. Examples of sulfur which may be used in the vulcanization process include various types of sulfur such as powdered sulfur, precipitated sulfur, and insoluble sulfur. Examples of sulfur donors include, but are not limited to tetramethylthiuram disulfide, tetraethylthiuram disulfide, tetrabutylthiuram disulfide, dipentamethylene thiuram hexasulfide, dipentamethylene thiuram tetrasulfide, dithiodimorpholine, and mixtures thereof.

Sulfur donors may be used instead or in addition to the sulfur. Herein the term "sulfur" shall further also include sulfur donors and the mixture of sulfur and sulfur donor(s). Further, the quantity of sulfur employed in the vulcanization process when applied to sulfur donors, means the quantity of sulfur that is rendered by the sulfur donor.

More particularly, the present invention relates to a sulfur-vulcanized elastomer as recited in claim 7, particularly rubber composition which comprises the vulcanization reaction product of: (a) 100 parts by weight of at least one natural or synthetic elastomer, particularly rubber; (b) 0.1 to 25 parts by weight of an amount of sulfur and/or an amount of sulfur donor providing 0.1 to 25 parts by weight of sulfur; and (c) 0.1 to 20 parts by weight of the particle of the invention. The term "particle" means any three-dimensional article of the aramid, thus excluding solutions, emulsions and the like of aramid. Preferably, the particle is powder, chopped fiber, staple fiber, or pellets made thereof.

The particle of the present invention is based on aramid polymers. Examples of such polymers include para-aramid and meta-aramid as well as combinations of two or more of these polymers. Most preferably, the particle is poly(para-phenylene-terephthalamide) fiber, which is commercially available under the trade name Twaron®, or co-poly-(para-phenylene/3,4'-oxydiphenylene terephthal-amide), which is commercially available under the trade name Technora®.

The amount of sulfur to be compounded with the elastomer, particularly rubber, based on 100 parts of elastomer, particularly rubber, is usually 0.1 to 25 parts by weight, and more preferably 0.2 to 8 parts by weight. The amount of particle to be compounded with the elastomer, particularly rubber, based on 100 parts of elastomer, particularly rubber, is 0.1 to 20 parts by weight, and preferably 0.2 to 15.0 parts by weight, and more preferably 0.5 to 10 parts by weight, most preferably in the range of 1 to 10 parts by weight. The vulcanization agent and the particle of the invention may be added as a pre-mix, or simultaneously or separately to the elastomer, particularly rubber, and they may be added separately or together with other elastomer, particularly rubber compounding ingredients as well. Usually it is also desirable to have a vulcanization accelerator in the elastomer, particularly rubber compound. Conventional known vulcanization accelerators may be employed. Preferred vulcanization accelerators include mercapto benzothiazole, 2,2'-mercapto benzothiazole disulfide, sulfenamide accelerators including N-cyclohexyl-2-benzothiazole sulfenamide, N-t-butyl-2-benzothiazole sulfenamide, N,N-dicyclohexyl-2-benzothiazole sulfenamide, and 2-(morpholinothio)benzothiazole; thiophosphoric acid derivative accelerators, thiurams, dithiocarbamates, diphenyl guanidine, diorthotolyl guanidine, dithiocarbamylsulfenamides, xanthates, triazine accelerators and mixtures thereof.

If the vulcanization accelerator is employed, quantities of from 0.1 to 8 parts by weight, based on 100 parts by weight of elastomer, particularly rubber composition, are used. More preferably, the vulcanization accelerator comprises 0.3 to 4.0 parts by weight, based on 100 parts by weight of elastomer.

The vulcanization process can also be performed by non-sulfur containing compounds, such as peroxides or a combination of metal oxide and ethylene thiourea. Preferably, the non-sulfur vulcanization process is performed by peroxides. Examples of peroxides which may be used in the vulcanization process include various types of dialkyl, alkyl-aralkyl, diaralkyl, alkyl-ketal and diaroyl peroxide and mixtures thereof. Peroxides can be either mono- or bis-peroxides. Examples of such peroxides include dicumyl peroxide, di(t-butyl)-peroxide, t-butylcumylperoxide, 2,5-dimethyl-2,5-di (t-butylperoxy)hexane, 2,5-dimethyl-2,5-di(t-butylperoxy) hexyne-3, butyl 4,4-di(t-butylperoxy)valerate and di(t-butylperoxyisopropyl)benzene. Peroxides can be technically pure or mixed with an inorganic support such as clay or silica, a polymeric support such as EPDM or combinations of these supports. Peroxides can be dispersed in silicone oil.

Furthermore, the vulcanization process can be carried out in the presence of a polymerizable multifunctional monomer.

The amount of peroxide to be compounded with the elastomer, particularly rubber is, based on 100 parts of elastomer, particularly rubber, usually 1 to 20 parts by weight, and more preferably 2 to 12 parts by weight. The amount of the particle of the invention, preferably peroxide treated aramid particle or pellet, to be compounded with the elastomer, particularly rubber is, based on 100 parts of elastomer, particularly rubber, 0.1 to 20 parts by weight, and preferably 0.2 to 15 parts by weight, and more preferably 0.5 to 10 parts by weight and most preferably 1 to 10 parts by weight. These ingredients may be employed as a pre-mix, or added simultaneously or separately, and they may be added separately or together with other elastomer, particularly rubber compounding ingredients as well.

Other conventional elastomer, particularly rubber additives may also be employed in their usual amounts in both sulfur vulcanization and peroxide vulcanization. For example, reinforcing agent such as carbon black, siliceous fillers such as silica and clay, whiting, and other mineral fillers, as well as mixtures of fillers, may be included in the elastomer, particularly rubber composition. Other additives such as process oils, tackifiers, waxes, antioxidants, antiozonants, pigments, resins, plasticizers, process aids, factice, compounding agents and activators such as stearic acid and zinc oxide may be included in conventional, known amounts. Rubber additives which may be used are well known to the skilled man and an extensive listing thereof can be found in textbooks such as W. Hofmann, "Rubber Technology Handbook, Chapter 4, Rubber Chemicals and Additives, pp. 217-353, Hanser Publishers, Munich 1989.

Further, scorch retarders such as phthalic anhydride, pyromellitic anhydride, benzene hexacarboxylic trianhydride, 4-methylphthalic anhydride, trimellitic anhydride, 4-chlorophthalic anhydride, N-cyclohexyl-thiophthalimide, salicylic acid, benzoic acid, maleic anhydride and N-nitrosodiphenylamine may also be included in the rubber composition in conventional, known amounts. Finally, in specific applications it may also be desirable to include steel-cord adhesion promoters such as cobalt salts and dithiosulfates in conventional quantities.

The process is carried out at a temperature of 110-220° C. over a period of up to 24 hours. More preferably, the process is carried out at a temperature of 120-190° C. over a period of up to 8 hours in the presence of 0.1 to 20 parts by weight, more preferable is the use of 0.5-10 parts by weight, most preferably is the use of 1-10 parts by weight, of the particles of the invention, more specifically, comprising powder, chopped fiber, staple fiber, or pellets made thereof. The additives to the elastomer, particularly rubber composition as mentioned above, may also be present during the vulcanization process.

In a more preferred embodiment the vulcanization process is carried out at a temperature of 120-190° C. for 8 hours or less in the presence of 0.1 to 8 parts by weight, based on 100 parts by weight of elastomer, particularly rubber, of at least one vulcanization accelerator.

The invention also includes articles of manufacture, such as skim products, tires, tire treads, tire undertreads, belts, or hoses which comprise sulfur- or peroxide-vulcanized rubber which is vulcanized in the presence of the particle of the present invention. Skim products are products that are produced from skim latex.

Skim latex is produced as a byproduct during the preparation of latex concentrate. It has a dry rubber content of only 3 to 7% and a very low dirt content.

The invention is further illustrated by the following examples which are not to be construed as limiting the invention in any way.

EXPERIMENTAL METHODS

In the following examples, rubber compounding, vulcanization and testing was carried out according to standard methods except as otherwise stated: Base compounds were mixed in a Farrel Bridge™ BR 1.6 liter Banbury type internal mixer (preheating at 50° C., rotor speed 77 rpm, mixing time 5 min with full cooling).

Vulcanization ingredients were added to the compounds on a Schwabenthan Polymix™ 150 L two-roll mill (friction 1:1.22, temperature 70° C., 3 min).

Cure characteristics were determined using a Monsanto™ rheometer MDR 2000E (arc)0.5° according to ISO 6502/1999. Delta S is defined as extent of crosslinking and is derived from subtraction of lowest torque (ML) from highest torque (MH).

Sheets and test specimens were vulcanized by compression molding in a Fontyne™ TP-400 press.

Tensile measurements were carried out using a Zwick™ 1445 tensile tester (ISO-2 dumbbells, tensile properties according to ASTM D 412-87, tear strength according to ASTM D 624-86).

Abrasion was determined using a Zwick abrasion tester as volume loss per 40 m path traveled (DIN 53516).

Hardness (IRHD) is measured according to ISO 48:1994.

Heat build-up and compression set after dynamic loading were determined using a Goodrich™ Flexometer (load 1 MPa, stroke 0.445 cm, frequency 30 Hz, start temperature 100° C., running time 120 min or till blow out; ASTM D 623-78). Dynamic mechanical analyses, for example loss modulus and tangent delta were carried out using an Eplexor™ Dynamic Mechanical Analyzer (dynamic strain 2%, frequency 10 Hz, temperature 60° C.; ASTM D 2231).

The Payne effect is a particular feature of the stress-strain behavior of rubber, especially rubber compounds containing fillers such as carbon black. The measurement is carried out under cyclic loading conditions, and is manifest as a dependence of the visco-elastic storage modulus on the amplitude of the applied strain. The measurement is done at 100° C. at frequency of 20 cpm with Rubber Processing Analyzer (RPA).

Example 1

Poly(para-phenylene-terephthalamide) which is commercially available under the trade name Twaron® was used in powder form (Twaron 5011) and as finish free 6 mm Twaron 1000 short cut fiber. Trigonox® 29-C75 is commercially available from Akzo Nobel Polymer Chemicals. Trigonox® 29 is a 75 wt % solution of 1,1-bis(t-butylperoxy)-3,5,5-trimethylcyclohexane in a mineral spirit. Dicumyl peroxide, 99% is commercially available from Aldrich. Luperox® 331 M80 is commercially available from Arkema. Luperox® 331 M80 is a 80 wt % solution of 1,1-bis(t-butyl-peroxy)cyclohexane in a mineral spirit.

To about 25 g of Twaron 5011 powder a solution of peroxide in acetone was added. The amount of acetone equaled twice the summed amounts of aramid and peroxide. The solution was completely absorbed by the powder. The solvents, both acetone and in case of Trigonox 29-C75, mineral spirits, were allowed to evaporate until the powder reached constant weight. Twaron 1000 short cut fibers were treated similarly. In Table 1 the resulting compositions are summarized.

TABLE 1

| Aramid treatments. | | | |
|---|---|---|---|
| Aramid:peroxide | wt %:wt % | wt % active oxygen | Entry |
| Twaron 1000:DCP | 74.9:25.1 | 1.49 | T1 |
| Twaron 1000:Tx 29 | 90.8:9.2 | 1.05 | T2 |
| Twaron 5011:DCP | 77.3:22.7 | 1.50 | T3 |
| Twaron 1000:Tx 29 | 86.7:13.3 | 1.41 | T4 |
| Twaron 5011:Tx 29 | 86.4:13.6 | 1.48 | T5 |

DCP is dicumyl peroxide;
Tx 29 is Trigonox 29-C75.

The accelerator employed was N-cyclohexyl-2-benzothiazole sulfenamide (CBS). Details of the formulations are given in Table 2.

TABLE 2

Rubber formulations incorporating aramid particles

| | Experiment | | | | | | |
|---|---|---|---|---|---|---|---|
| Ingredients | A | B | 1 | 2 | 3 | 4 | 5 |
| NR SVR 10 | 80 | 80 | 80 | 80 | 80 | 80 | 80 |
| Europrene BR 40 | 20 | 20 | 20 | 20 | 20 | 20 | 20 |
| Black N-326 | 55 | 53 | 53 | 53 | 53 | 53 | 53 |
| Zinc oxide | 5 | 5 | 5 | 5 | 5 | 5 | 5 |
| Stearic acid | 2 | 2 | 2 | 2 | 2 | 2 | 2 |
| Aromatic oil | 8 | 8 | 8 | 8 | 8 | 8 | 8 |
| Antidegradant 6PPD | 2 | 2 | 2 | 2 | 2 | 2 | 2 |
| Antioxidant TMQ | 1 | 1 | 1 | 1 | 1 | 1 | 1 |
| Sunolite 240 | 2 | 2 | 2 | 2 | 2 | 2 | 2 |
| Accelerator CBS | 1.5 | 1.5 | 1.5 | 1.5 | 1.5 | 1.5 | 1.5 |
| sulfur | 1.5 | 1.5 | 1.5 | 1.5 | 1.5 | 1.5 | 1.5 |
| T1 | 0 | 0 | 3 | 0 | 0 | 0 | 0 |
| T2 | 0 | 0 | 0 | 3 | 0 | 0 | 0 |
| T3 | 0 | 0 | 0 | 0 | 3 | 0 | 0 |
| T4 | 0 | 0 | 0 | 0 | 0 | 3 | 0 |
| T5 | 0 | 0 | 0 | 0 | 0 | 0 | 3 |

NR is natural rubber;
BR is polybutadiene;
6PPD is N-1,3-dimethylbutyl-N'-phenyl-p-phenylenediamine,
TMQ is polymerized 2,2,4-trimethyl-1,2-dihydo-quinoline antioxidant, Sunolite 240 is a microcrystalline wax,
CBS is N-cyclohexyl benzothiazyl sulfenamide.

The vulcanized rubbers listed in Table 2 were tested according to ASTM/ISO norms as described under Experimental methods. A and B are control experiments (rubber only) and 1 to 5 are experiments according to the invention. The results are given in Tables 3-5.

TABLE 3

Effect of the mixes at 100° C. on processing characteristics (Mooney viscosity).

| | Experiment | | | | | | |
|---|---|---|---|---|---|---|---|
| | A | B | 1 | 2 | 3 | 4 | 5 |
| ML(1 + 4), MU | 42.8 | 43.1 | 40.2 | 37.2 | 40.9 | 37.7 | 39.0 |

The data of Table 3 show that the peroxide treated aramid particles according to the invention (mix 1 to 5) show low viscosity as evidenced from the ML (1+4) values.

TABLE 4

Effect of the mixes at 150° C. on delta torque.

| | Experiment | | | | | | |
|---|---|---|---|---|---|---|---|
| | A | B | 1 | 2 | 3 | 4 | 5 |
| Delta S, Nm | 1.59 | 1.51 | 1.58 | 1.60 | 1.53 | 1.55 | 1.52 |

The data in Table 4 show that the particles according to the invention (1 to 5) do not influence the extent of crosslinking as demonstrated by delta S values.

TABLE 5

Evaluation of peroxide treated aramid particles in Payne effect

| | Experiment | | | | | | |
|---|---|---|---|---|---|---|---|
| | A | B | 1 | 2 | 3 | 4 | 5 |
| $\Delta(G'_{0.7}-G'_{20})$ (kPa) | 161 | 159 | 101 | 113 | 94 | 78 | 88 |
| $\Delta(G'_{0.7}-G'_{90})$ (kPa) | 207 | 205 | 150 | 155 | 141 | 122 | 131 |

It is clear from the data depicted in Table 5 that the particles of the invention have a lower Payne effect.

Example 2

Co-poly-(para-phenylene/3,4'-oxydiphenylene terephthalamide) which is commercially available under the trade name Technora® was used in powder form. Poly-(metaphenylene isophthalamide) is commercially available under the trade name Teijinconex® and was used both as powder and as short cut fiber. Trigonox® 29-C75 is commercially available from Akzo Nobel Polymer Chemicals. Trigonox® 29-C75 is a 75 wt % solution of 1,1-bis(t-butylperoxy)-3,5,5-trimethyl-cyclohexane in a mineral spirit. Luperox® 331 M80 is commercially available from Arkema. Luperox® 331 M80 is a 80 wt % solution of 1,1-bis(t-butylperoxy)cyclohexane in a mineral spirit.

To about 25 g of Teijinconex powder a solution of peroxide in acetone was added. The amount of acetone equaled twice the summed amounts of aramid and peroxide. The solution was completely absorbed by the powder. The solvents, both acetone and mineral spirits, were allowed to evaporate until the powder reached constant weight. Teijinconex short cut fibers and Technora powder were treated similarly. In Table 6 the resulting compositions are summarized.

TABLE 6

Aramid treatments.

| Aramid:peroxide | wt %:wt % | wt % active oxygen | Entry |
|---|---|---|---|
| Teijinconex powder:Tx 29 | 85.3:14.7 | 0.95 | T6 |
| Teijinconex powder:Lx 331 | 83.4:16.6 | 0.97 | T7 |
| Teijinconex fiber:Tx 29 | 92.1:7.9 | 0.84 | T8 |
| Technora powder:Tx 29 | 90.5:9.5 | 1.0 | T9 |

Lx 331 is Luperox ® 331M80;
Tx 29 is Trigonox 29-C75.

The accelerator employed was N-cyclohexyl-2-benzothiazole sulfenamide (CBS). Details of the formulations are given in Table 7.

TABLE 7

Rubber formulations incorporating aramid particles

| | Experiment | | | | | |
|---|---|---|---|---|---|---|
| Ingredients | C | D | 6 | 7 | 8 | 9 |
| NR SVR 10 | 80 | 80 | 80 | 80 | 80 | 80 |
| Europrene BR 40 | 20 | 20 | 20 | 20 | 20 | 20 |
| Black N-326 | 55 | 53 | 53 | 53 | 53 | 53 |
| Zinc oxide | 5 | 5 | 5 | 5 | 5 | 5 |
| Stearic acid | 3 | 3 | 3 | 3 | 3 | 3 |
| Aromatic oil | 8 | 8 | 8 | 8 | 8 | 8 |
| Antidegradant 6PPD | 2 | 2 | 2 | 2 | 2 | 2 |
| Antioxidant TMQ | 1 | 1 | 1 | 1 | 1 | 1 |
| Sunolite 240 | 2 | 2 | 2 | 2 | 2 | 2 |
| Accelerator CBS | 1.5 | 1.5 | 1.5 | 1.5 | 1.5 | 1.5 |
| sulfur | 1.5 | 1.5 | 1.5 | 1.5 | 1.5 | 1.5 |
| T6 | 0 | 0 | 2 | 0 | 0 | 0 |
| T7 | 0 | 0 | 0 | 2 | 0 | 0 |
| T8 | 0 | 0 | 0 | 0 | 2 | 0 |
| T9 | 0 | 0 | 0 | 0 | 0 | 2 |

NR is natural rubber;
BR is polybutadiene;
6PPD is N-1,3-dimethylbutyl-N'-phenyl-p-phenylenediamine,
TMQ is polymerized 2,2,4-trimethyl-1,2-dihydo-quinoline antioxidant, Sunolite 240 is a microcrystalline wax;
CBS is N-cyclohexyl benzothiazyl sulfenamide.

The vulcanized rubbers listed in Table 7 were tested according to ASTM/ISO norms as described under Experimental methods. C and D are control experiments (rubber only) and 6 to 9 are experiments according to the invention. The results are given in Tables 8-10.

TABLE 8

Effect of the mixes at 100° C. on processing characteristics (Mooney viscosity).

| | Experiment | | | | |
|---|---|---|---|---|---|
| | C | D | 6 | 7 | 8 | 9 |
| ML(1 + 4), MU | 45.5 | 42.6 | 42.6 | 44.5 | 40.9 | 39.1 |

The data of Table 8 show that the peroxide treated aramid particles according to the invention (mix 6 to 9) show low viscosity as evidenced from the ML (1+4) values.

TABLE 9

Effect of the mixes at 150° C. on delta torque.

| | Experiment | | | | |
|---|---|---|---|---|---|
| | C | D | 6 | 7 | 8 | 9 |
| Delta S, Nm | 1.56 | 1.49 | 1.47 | 1.49 | 1.55 | 1.49 |

The data in Table 9 show that the particles according to the invention (6 to 9) do not influence the extent of crosslinking as demonstrated by delta S values.

TABLE 10

Evaluation of peroxide treated aramid particles in Payne effect and hysteresis.

| | Experiment | | | | |
|---|---|---|---|---|---|
| | C | D | 6 | 7 | 8 | 9 |
| $\Delta(G'_{0.7}\text{-}G'_{20})$ (kPa) | 162 | 132 | 95 | 92 | 102 | 92 |
| $\Delta(G'_{0.7}\text{-}G'_{90})$ (kPa) | 211 | 178 | 143 | 142 | 149 | 134 |
| tan δ | 0.152 | 0.143 | 0.118 | 0.111 | 0.117 | 0.126 |

It is clear from the data depicted in Table 10 that the particles of the invention have a lower Payne effect and lower hysteresis (tan δ).

Example 3

Based on WO 95/22576

Poly(para-phenylene-terephthalamide) which is commercially available under the trade name Twaron® was used as finish free 6 mm Twaron 1000 short cut fiber. Dicumyl peroxide, 99% is commercially available from Aldrich. Toluene-2,4-di-isocyanate (TDI) is available from Aldrich. Polybutadiene diacrylate is commercially available under the trade name SR307 from Sartomer. Bis(2-ethyl-hexylmaleate) is available from Aldrich.

A solution of the required amounts of toluene-2,4-diisocyanate, polybutadiene diacrylate, bis(2-ethylhexylmaleate), and dicumyl peroxide in 75 mL of acetone was prepared. The sum of toluene-2,4-diisocyanate, polybutadiene diacrylate, and bis(2-ethylhexyl)maleate was 12 percent by weight of the amount of fiber. The weight ratio of toluene-2,4-diisocyanate, polybutadiene diacrylate and bis(2-ethylhexyl)maleate was 4:1:15. This solution was added to about 25 g of Twaron 1000 short cut fiber. The solution was completely absorbed by the short cut fiber. Acetone was allowed to evaporate until the fiber reached constant weight. In Table 11 the results are summarized.

TABLE 11

| wt % of aramid | wt % dicumyl peroxide based on aramid | Active oxygen on yarn (w %) | Entry |
|---|---|---|---|
| Outside claimed range: | | | |
| 89.6 | 0 | 0 | T10 |
| 89.6 | 0 | 0 | T11 |
| 89.2 | 0.34 | 0.02 | T12 |
| 89.0 | 0.68 | 0.04 | T13 |
| 88.5 | 1 | 0.06 | T14 |
| Within claimed range: | | | |
| 85.9 | 3.4 | 0.2 | T15 |
| 83.2 | 6.6 | 0.4 | T16 |
| 75.0 | 17 | 1.0 | T17 |
| 74.1 | 17 | 1.0 | T18 |
| 66.4 | 25 | 1.5 | T19 |

The accelerator employed was N-cyclohexyl-2-benzothiazole sulfenamide (CBS). Details of the formulations are given in Table 12.

TABLE 12

Rubber formulations incorporating aramid particles

| | Experiment | | | | | | | | | | | |
|---|---|---|---|---|---|---|---|---|---|---|---|---|
| Ingredients | E | F | 10 | 11 | 12 | 13 | 14 | 15 | 16 | 17 | 18 | 19 |
| NR SVR 10 | 80 | 80 | 80 | 80 | 80 | 80 | 80 | 80 | 80 | 80 | 80 | 80 |
| Europrene BR 40 | 20 | 20 | 20 | 20 | 20 | 20 | 20 | 20 | 20 | 20 | 20 | 20 |
| Black N-326 | 55 | 53 | 53 | 53 | 53 | 53 | 53 | 53 | 53 | 53 | 53 | 53 |
| Zinc oxide | 5 | 5 | 5 | 5 | 5 | 5 | 5 | 5 | 5 | 5 | 5 | 5 |
| Stearic acid | 2 | 2 | 2 | 2 | 2 | 2 | 2 | 2 | 2 | 2 | 2 | 2 |
| Aromatic oil | 8 | 8 | 8 | 8 | 8 | 8 | 8 | 8 | 8 | 8 | 8 | 8 |
| Antidegradant 6PPD | 2 | 2 | 2 | 2 | 2 | 2 | 2 | 2 | 2 | 2 | 2 | 2 |
| Antioxidant TMQ | 1 | 1 | 1 | 1 | 1 | 1 | 1 | 1 | 1 | 1 | 1 | 1 |
| Sunolite 240 | 2 | 2 | 2 | 2 | 2 | 2 | 2 | 2 | 2 | 2 | 2 | 2 |
| Accelerator CBS | 1.5 | 1.5 | 1.5 | 1.5 | 1.5 | 1.5 | 1.5 | 1.5 | 1.5 | 1.5 | 1.5 | 1.5 |
| sulfur | 1.5 | 1.5 | 1.5 | 1.5 | 1.5 | 1.5 | 1.5 | 1.5 | 1.5 | 1.5 | 1.5 | 1.5 |
| T10 | 0 | 0 | 3 | 0 | 0 | 0 | 0 | 0 | 0 | 0 | 0 | 0 |
| T11 | 0 | 0 | 0 | 3 | 0 | 0 | 0 | 0 | 0 | 0 | 0 | 0 |
| T12 | 0 | 0 | 0 | 0 | 3 | 0 | 0 | 0 | 0 | 0 | 0 | 0 |

TABLE 12-continued

Rubber formulations incorporating aramid particles

| Ingredients | E | F | 10 | 11 | 12 | 13 | 14 | 15 | 16 | 17 | 18 | 19 |
|---|---|---|---|---|---|---|---|---|---|---|---|---|
| T13 | 0 | 0 | 0 | 0 | 0 | 3 | 0 | 0 | 0 | 0 | 0 | 0 |
| T14 | 0 | 0 | 0 | 0 | 0 | 0 | 3 | 0 | 0 | 0 | 0 | 0 |
| T15 | 0 | 0 | 0 | 0 | 0 | 0 | 0 | 3 | 0 | 0 | 0 | 0 |
| T16 | 0 | 0 | 0 | 0 | 0 | 0 | 0 | 0 | 3 | 0 | 0 | 0 |
| T17 | 0 | 0 | 0 | 0 | 0 | 0 | 0 | 0 | 0 | 3 | 0 | 0 |
| T18 | 0 | 0 | 0 | 0 | 0 | 0 | 0 | 0 | 0 | 0 | 3 | 0 |
| T19 | 0 | 0 | 0 | 0 | 0 | 0 | 0 | 0 | 0 | 0 | 0 | 3 |

NR is natural rubber;
BR is polybutadiene;
6PPD is N-1,3-dimethylbutyl-N'-phenyl-p-phenylenediamine,
TMQ is polymerized 2,2,4-trimethyl-1,2-dihydo-quinoline antioxidant,
Sunolite 240 is a microcrystalline wax,
CBS is N-cyclohexyl benzothiazyl sulfenamide.

The vulcanized rubbers listed in Table 12 were tested according to ASTM/ISO norms as described under Experimental methods. E and F are control experiments (rubber only) and 10 to 15 are experiments at low peroxide content and experiments 16 to 19 are experiments according to the invention. The results are given in Tables 14-17.

TABLE 13

Effect of the mixes at 100° C. on processing characteristics (Mooney viscosity).

| | E | F | 10 | 11 | 12 | 13 | 14 | 15 | 16 | 17 | 18 | 19 |
|---|---|---|---|---|---|---|---|---|---|---|---|---|
| ML(1 + 4), MU | 42.8 | 43.3 | 41.2 | 41.2 | 41.6 | 39.2 | 41.5 | 41.0 | 40 | 37.4 | 39.7 | 38.7 |

The data of Table 13 show that the peroxide treated aramid particles according to the invention (mix 16 to 19) show low viscosity as evidenced from the ML (1+4) values.

TABLE 14

Effect of the mixes at 150° C. on delta torque.

| | E | F | 10 | 11 | 12 | 13 | 14 | 15 | 16 | 17 | 18 | 19 |
|---|---|---|---|---|---|---|---|---|---|---|---|---|
| Delta S, Nm | 1.55 | 1.54 | 1.61 | 1.66 | 1.66 | 1.67 | 1.66 | 1.60 | 1.63 | 1.56 | 1.56 | 1.53 |

The data in Table 14 show that the particles according to the invention (16 to 19) do not influence the extent of crosslinking as demonstrated by delta S values.

TABLE 15

Evaluation of particles in Payne effect relative to experiment F.

| | E | F | 10 | 11 | 12 | 13 | 14 | 15 | 16 | 17 | 18 | 19 |
|---|---|---|---|---|---|---|---|---|---|---|---|---|
| Relative $\Delta(G'_{0.7}\text{-}G'_{90})$ (kPa) | 1.02 | 1 | 1.26 | 1.15 | 1.15 | 1.13 | 1.04 | 1.14 | 0.89 | 0.76 | 0.65 | 0.60 |

It is clear from the data depicted in Table 15 that the particles of the invention (mix 16 to 19) have a lower Payne effect than the particles having lower dicumyl peroxide content (mix 10 to 15).

TABLE 16

Evaluation of particles in hysteresis relative to experiment F.

| Experiment | | | | | | | | | | | | |
|---|---|---|---|---|---|---|---|---|---|---|---|---|
| | E | F | 10 | 11 | 12 | 13 | 14 | 15 | 16 | 17 | 18 | 19 |
| Relative tan δ | 1.08 | 1 | 1.05 | 1.05 | 1.07 | 1.06 | 1.0 | 0.98 | 0.88 | 0.78 | 0.74 | 0.70 |

It is clear from the data depicted in Table 16 that addition of the particles of the invention (mix 16 to 19) to the rubber results in a lower tan δ and thus lower hystereris than the particles having lower dicumyl peroxide content (mix 10 to 15).

At 0.34 wt % dicumyl peroxide based on aramid weight, a slight negative effect was observed of the peroxide treated aramid fiber in rubber compositions. At doubled and tripled amounts still no improvement in tangent δ of the vulcanized rubber was found. At about 3 wt % dicumyl peroxide on yarn a small positive effect on tangent delta was observed. Further increase of peroxide leads to a further reduction in tangent δ of the vulcanized rubber.

The invention claimed is:

1. An aramid particle comprising:
as the only polymer, a polymer selected from the group consisting of para-aramid, meta-aramid, or a combination of para-aramid and meta-aramid; and
a peroxide radical initiator,
wherein
the particle contains 3-40 wt % peroxide radical initiator based on a weight of the aramid particle, and
the peroxide radical initiator is completely absorbed in the aramid particle.

2. The aramid particle of claim 1, wherein the particle contains 6-30 wt % of the peroxide radical initiator.

3. The aramid particle of claim 1, wherein the particle is a fiber, chopped fiber, staple fiber, fibrid, fibril, powder or bead.

4. The aramid particle of claim 1, wherein the peroxide radical initiator is selected from the group consisting of dialkyl peroxyketal, dialkyl peroxide, di(alkylperoxy)alkylene, di(alkylperoxy)aralkylene, and mixtures thereof.

5. The aramid particle of claim 4, wherein the peroxide radical initiator is at least one of 1,1-(t-butylperoxy)cyclohexane and 1,1-(t-butyl-peroxy)-3,3,5-trimethylcyclohexane.

6. The aramid particle of claim 1, wherein the polymer is selected from the group consisting of poly(p-phenylene-terephthalamide), co-poly-(p-phenylene/3,4'-oxydiphenylene terephthalamide), and poly-(m-phenylene isophthalamide).

7. An aramid particle-elastomer composition comprising:
(a) 100 parts by weight of at least one natural or synthetic elastomer,
(b1) 0.1 to 25 parts by weight of sulfur, an amount of a sulfur donor providing an equivalent of 0.1 to 25 parts by weight of sulfur, or a mixture of sulfur and a sulfur donor to an equivalent total of 0.1 to 25 parts by weight of sulfur; or
(b2) 0.1 to 20 parts by weight of a peroxide; and
(c) 0.1 to 20 parts by weight of the particle of claim 1.

8. A skim product comprising the particle-elastomer composition of claim 7 and a skim additive.

9. A mechanical rubber good comprising the composition of claim 7 and optionally a skim additive.

10. The mechanical rubber good of claim 9, which is selected from a tire, a tire tread, an undertread, a belt, and a hose.

11. A method for vulcanizing an elastomer, by vulcanizing synthetic or natural elastomer, in the presence of the particle of claim 1 and a vulcanization agent selected from the group consisting of sulfur, a sulfur donor, and a peroxide.

12. The method according to claim 11 wherein the vulcanization is performed in the presence of 10 to 100 parts by weight of a filler selected from a group consisting of carbon black, siliceous filler, and mixtures thereof.

* * * * *